United States Patent Office 3,223,478
Patented Dec. 14, 1965

3,223,478
STORAGE STABILITY OF AMMONIUM NITRATE
Joseph F. Wilson, Bartlesville, Okla., assignor to Phillips Petroleum Company, a corporation of Delaware
No Drawing. Filed May 9, 1962, Ser. No. 193,612
14 Claims. (Cl. 23—103)

This invention relates to an improvement in the storage stability of ammonium nitrate. In another aspect, it relates to a method of improving the storage stability of particulate ammonium nitrate by coating the same with a novel coating agent, and to the improved ammonium nitrate product so obtained. In another aspect, it relates to a novel material particularly suitable as a coating agent for ammonium nitrate to improve the storage stability thereof. In a further aspect, it relates to an explosive composition containing an ammonium nitrate product coated with a novel agent to improve its storage stability.

Ammonium nitrate in powder, crystalline, or granular form has a normal tendency to undergo volume changes during storage. For example, ammonium nitrate is known to have five crystalline phases within the temperature range of −50 to 130° C. at one atmosphere pressure. These phases are: phase V, below −18° C.; phase IV, from −18 to 32° C.; phase III, from 32 to 84° C.; phase II, from 84° to 125° C.; and phase I, from 125 to 175° C. (the melting point). Ammonium nitrate is generally stored under varying temperature conditions, for example −10° C. and lower in winter to temperatures as high as 40° C. and higher in summer. As seasonal and daily temperature changes occur, the salt may be in any one of several different phases, the transitions from one phase to another causing changes in volume of the salt. Where the salt is stored in bags, it is not uncommon to find that such bags have burst due to the swelling or increased volume occasioned by subjection of the bagged product to fluctuations in temperature. The bursting of such bags is of course undesirable since it may result in loss of the salt, damage to surroundings, etc. Similarly, where ammonium nitrate is used as the oxidizer component in composite type solid propellants, such as those where the ammonium nitrate is dispersed in a rubbery polymer binder, grains of such propellant will sometimes crack or crumble internally under temperature variations due to the volume change which accompanies the change in structure from one phase to another.

Another problem commonly associated with ammonium nitrate is its normal tendency to cake or become sticky on standing and form hard masses. This caking is usually attributable to changes in humidity, temperature, and/or pressure, and occurs under conditions during storing, shipping and handling. Caking of the salt presents difficulties in its handling, for example, where the salt is used as fertilizer this caking tendency impairs the drillability of the fertilizer and increases the cost of uniformly distributing the fertilizer in the field because the caked fertilizer causes clogging of the distribution machine and many other problems. Also, where ammonium nitrate is used as an ingredient in explosive compositions, the caking tendency of such salt can adversely affect the sensitivity of said explosive composition, and may render it incapable of satisfactory detonation.

Many methods have been proposed, used or patented in the past for improving the storage stability of ammonium nitrate, including treatment of the salt with various conditioning agents to prevent caking. While some of these methods and prior art conditioning agents have been satisfactory in providing some measure of storage stability, others have been proven unsatisfactory, particularly with respect to swelling.

Accordingly, an object of this invention is to improve the storage stability of ammonium nitrate. Another object is to provide an improved method of treating particulate ammonium nitrate to improve its storage stability, that is, reduce its normal tendency to cake and/or swell on standing. Another object is to produce an improved storage stable ammonium nitrate product. Another object is to provide a novel material particularly useful in coating ammonium nitrate. Another object is to provide a novel material particularly useful in coating ammonium nitrate. Another object is to provide improved explosive compositions containing storage stable ammonium nitrate, such explosive compositions being characterized by satisfactory sensitizing and detonation properties. Further objects and advantages of this invention will become apparent to those skilled in the art from the following discussion and appended claims.

I have now discovered that the storage stability of particulate ammonium nitrate can be improved by coating such ammonium nitrate with a novel coating agent comprising a major amount of attapulgite, kaolin or diatomaceous earth, and a minor amount of an oil-soluble alkaline earth metal salt of petroleum sulfonic acids, for example the calcium petroleum sulfonates.

Attapulgite, used in a major amount in the coating agent of this invention, is a clay which is unique among clay minerals in that its structure is chain-like or fibrous and it exhibits a very different geometry from the platy minerals. Furthermore, when compared to other clays, attapulgite has a high magnesium content, as evidenced by the following typical attapulgite analysis:

TABLE I

| Component: | Amount, weight percent |
|---|---|
| $SiO_2$ | 55.03 |
| $Al_2O_3$ | 10.24 |
| $Fe_2O_3$ | 3.53 |
| $MgO$ | 10.49 |
| $K_2O$ | 0.47 |
| $H_2O$ (removed at 150° C.) | 9.73 |
| $H_2O$ (removed at higher temperature) | 10.13 |

Attapulgite is sold as an article of commerce under various trade names, such as Attasorb (1 to 14 microns, averaging 4 microns), Attagel (a colloidal attapulgite, 0.03 to 2.0 microns, averaging 0.2 micron), Attacote (1 to 33 microns, averaging 6 microns), and Attaclay (5 to 80 microns, averaging 25 microns). The attapulgite I prefer to use has a particle size from 0.2 to 80 microns, especially where more than 90 percent is in the particle size range of 1 to 25 microns.

Kaolin, which can also be used in a major amount in the coating agent of this invention, is a clay whose essential constituent is the mineral kaolinite, a hydrated aluminum silicate. Kaolin is sold as an article of commerce under various trade names, such as Paragon Clay, Suprex Clay, Barden Clay and Barnet Clay; a specification of the latter type, having a standard U.S. Sieve mesh size of 98% through a 325 mesh screen, is given in Table II. Suprex, Barden, and Barnet Clays are all beta-axis disordered, while Paragon is not.

TABLE II

| Component: | Amount, weight percent |
|---|---|
| $SiO_2$ | 45.37 |
| $Al_2O_3$ | 37.28 |
| $Fe_2O_3$ | 1.43 |
| $TiO_2$ | 2.05 |
| CaO | 0.05 |
| MgO | 0.12 |
| $Na_2O$ | 0.21 |
| $K_2O$ | 0.117 |
| Loss on ignition* | 13.41 |

*The loss on ignition is essentially all chemically combined water.

Diatomaceous earth, which can be used in place of attapulgite kaolin in the novel two-component coating agent of this invention, is a hydrous, opaline form of silica composed of the silaceous skeletons of microscopic aquatic plants. It is essentially silica of the formula $SiO_2 \cdot xH_2O$, wherein $x$ varies such that the chemically combined water will comprise from 2 to 10 percent by weight of the diatomaceous earth.

The alkaline earth metal salts of petroleum sulfonic acids, employed in a minor amount as the other essential component of the novel coating agent of this invention, are oil soluble and water insoluble. These alkaline earth metal salts of petroleum sulfonic acids are produced by sulfonating petroleum fractions, particularly lubricating oil fractions, with a sulfonation agent, such as fuming sulfuric acid, and neutralizing the resulting petroleum sulfonic acids with an alkaline earth hydroxide, such as calcium or potassium hydroxide. The petroleum fractions which I prefer to use in preparing these sulfonates are deasphalted and solvent refined lubricating oil bright stocks having a viscosity of at least 90 SUS at 210° F., preferably about 140 to 720 SUS at 210° F. A specifically preferred sulfonation stock is a highly paraffinic, propane-fractionated, solvent extracted and dewaxed Mid-Continent oil of about 180 to 230 SUS at 210° F. and having a viscosity index of at least 85 to 100 or even higher. The residual material from the propane fractionation contains the rejected asphalt and more aromatic oils. Following the propane fractionation step the overhead oil fraction is solvent extracted with a selective solvent, such as phenol, which will separate the paraffinic hydrocarbons from the more aromatic type hydrocarbons for removal of the latter. These sulfonates that I employ in my coating agents are preferably prepared as described and claimed in copending application Serial No. 665,985 filed June 17, 1957, by William B. Whitney et al. The alkaline earth metal petroleum sulfonates produced according to the Whitney et al. method are dark red resinous materials having an average molecular weight of about 2000 to about 4000, and are insoluble in water and soluble in lube oils.

The inorganic component of the coating agents of this invention, that is the attapulgite, kaolin, or diatomaceous earth, is admixed with the alkaline earth metal petroleum sulfonates, and this two-component mixture is used in coating the particulate ammonium nitrate. Such coating agents will reduce the tendency to cake on standing. In that case where attapulgite is employed as the inorganic component, the coating agent will not only reduce the tendency of the coated ammonium nitrate to cake but will also reduce its tendency to swell when subjected to temperature changes, and for this reason I prefer to use attapulgite as the inorganic component.

These coating agents can be prepared by a variety of methods. For example, a hydrocarbon solution of the alkaline earth metal petroleum sulfonate can be sprayed onto the inorganic component, or all the inorganic component can be slurried up in a hyrdocarbon solution of the metal petroleum sulfonate. In still another method, the inorganic base can be merely dry-mixed with the metal petroleum sulfonate. In order to ensure a homogenous mixture of the two components, I prefer to employ some method of violently agitating the mixture, such as a Waring blendor in which knife blades shear the material together. Such mixing can be carried out for a short period of time, usually less than 5 to 30 minutes. It is prefered to dry the inorganic component of the coating agent to a maximum water content of 10 to 15 weight percent before admixing it with the metal petroleum sulfonate. However, if desired, the two-component mixture can be subsequently dried after preparation. Normally, the final coating agent will contain from 0.5 to 8 weight percent water. It is this mixture which is coated on the particulate ammonium nitrate, and this coating can be accomplished by tumbling the coating agent with the ammonium nitrate, or any other means of contact can be used. The particle size of the inorganic component can vary and will generally have a size finer than 200 mesh, generally finer than 300 mesh, U.S. Standard Sieve. The ammonium nitrate can be in the form of prills, granules, or other particle forms, and after it is coated with the novel coating agent of this invention, the coated product will have a moisture content generally not greater than about 0.3 weight percent, preferably less than 0.2 weight percent, and the coated ammonium nitrate product can be subsequently dried further if necessary.

The amount of the coating agent used in this invention will be, stated functionally, that sufficient to increase the storage stability of the ammonium nitrate, particularly an amount sufficient to reduce the normal tendency of the ammonium nitrate to cake on standing. Generally, only a small amount of coating agent is necessary to provide storage stability, with amounts in the range of about 0.5 to 5 weight percent of the coated ammonium nitrate being generally applicable. The metal petroleum sulfonates can be used in the form of particulate solid, but I prefer to mix the inorganic component with the metal petroleum sulfonates in a hydrocarbon solution of 5 to 75 weight percent hydrocarbon, preferably about a 50 weight percent hydrocarbon. The amount of the metal petroleum sulfonates used in this invention will vary and generally will be sufficient to amount to from 0.25 to 12 weight percent, preferably 0.25 to 5 weight percent, of the coating agent. Thus, when the coating agent is applied to the ammonium nitrate, the amount of the metal petroleum sulfonate component on the ammonium nitrate will be quite small, for example from 0.01 to 0.05 weight percent of the coated ammonium nitrate.

As mentioned hereinbefore, the treated ammonium nitrate is useful in explosive compositions where such salts are used in admixture with combustible carbonaceous material. Generally, the explosive compositions of this invention will contain a major amount of the hereindescribed treated ammonium nitrate as oxidizer, and a minor amount of combustible carbonaceous material. Usually this will be in the range between 93 to 98 weight percent of the treated ammonium nitrate and 2 to 7 weight percent of the carbonaceous material. The combustible carbonaceous material employed in preparing these novel explosive compositions include any of those proposed or used heretofore. In particular, the combustible carbonaceous materials I prefer to employ are paraffinic hydrocarbons boiling in the range between 350 and 725° F., with an API gravity of from 20 to 60, and a viscosity of 25 to 140 SUS at 100° F. A specific combustible carbonaceous material of this type is diesel fuel. Other known solid combustible carbonaceous materials which can be employed include ground walnut hulls, asphalt, pitch, kerosene, coal tar, and the like. Liquid combustible carbonaceous materials are preferred.

Although the novel two-component coating agent of this invention when used by itself is sufficient to satisfactorily reduce or prevent the normal swelling and caking tendencies of ammonium nitrate treated therewith, it is also within the scope of this invention to utilize other known coating agents in combination with the two-component agent of this invention.

Further objects and advantages of this invention will become apparent from the following examples; however, the subject invention is not to be limited unduly to these examples or to the specific ingredients, amounts, temperatures, etc., expressed in these examples, since the same are set forth merely for illustrative purposes.

Example I

A number of runs were carried out in which calcium petroleum sulfonate was admixed with one of attapulgite, kaolin, and diatomaceous earth to prepare the novel coating agents of this invention. Prills of ammonium nitrate were then coated with the different coating agents and the ability of such coating agents to improve the storage stability of the ammonium nitrate was then evaluated. Similar runs were carried out in which ammonium nitrate prills were coated for purposes of comparison with just one of the inorganic materials, viz., attapulgite, kaolin or diatomaceous earth. Uncoated ammonium nitrate prills were also evaluated.

The calcium petroleum sulfonate employed in these runs was prepared in the following manner. A propane-fractionated, phenol extracted and dewaxed Mid-Continent lubricating oil fraction of about 203 SUS at 210° F. and having a viscosity index of about 93 was sulfonated with a solution of about 10 weight percent $SO_3$ in liquid $SO_2$ at 110° F. for about 10 minutes. The $SO_3$-to-oil weight ratio was about 0.08 to 1. The sulfonation effluent was flashed to remove $SO_2$, leaving a solution of about 48 weight percent petroleum sulfonic acids in unsulfonated oil. This mixture was then diluted with Stoddard solvent (a petroleum naptha) and the petroleum sulfonic acids neutralized by addition of an aqueous slurry of excess calcium hydroxide. The neutralized mixture was then stabilized by heating, and dried in a flash tower. After drying, the bottoms from the drying tower were diluted with additional Stoddard solvent and filtered to remove solids. A concentrate of about 50 weight percent calcium petroleum sulfonate and 50 weight percent unsulfonated oil was produced from one portion of the filtrate by removing the Stoddard solvent. This 50 weight percent solution is hereinafter referred to as "sulfonate A." All of the Stoddard solvent was removed from the other portion of the filtrate to produce the concentrate comprising 100 weight percent calcium petroleum sulfonate, and this concentrate is hereinafter referred to as "sulfonate B."

Both sulfonate A and sulfonate B were diluted 100 percent (by weight) with benzene and the resulting sulfonate solutions were then individually mixed with one of attapulgite, kaolin and diatomaceous earth. The coating agents were produced in each case by charging one of the inorganic materials to a Waring Blendor, and while the blender was stopped half of the benzene solution of sulfonate was added by dropping small drops thereof over a wide area of the inorganic material exposed in the blender. The blender was then turned on, and the inorganic material and sulfonate were sheared violently for two or three minutes. The blender was then stopped, and the remainder of the benzene solution of sulfonate was added in a like manner, after which the mixture was again chopped violently in the blender. The admixture of sulfonate and inorganic material was then placed in a vacuum oven at water aspirator vacuum at 60° C. to remove the benzene. The dried mixture was then removed from the oven and charged to a large mouth, one-quart fluid jar which was sealed tightly until the mixture was used in coating. The mixture, or coating agent, was tumbled onto ammonium nitrate prills at 78 r.p.m. in a one-quart jar for not less than 10 minutes. The moisture content of the coated ammonium nitrate prills was then determined, after which the coated ammonium nitrate prills were evaluated for storage stability.

The tendency of the ammonuim nitrate samples to cake on standing was evaluated by a "cake test," a procedure which is a modification of that described in Ind. and Eng. Chem. 33, 121–127 (1941). In the "cake test," 65 g. portions of the ammonium nitrate was poured into polyethylene cylinders fabricated of two layers of 1.5 mil wall thickness polyethylene. The inside diameter of the cylinders was 1⅞ in., and the ends of the cylinders were blocked with Lucite blocks ½ in. thick and 1⅛ in. in diameter. The blocks were held in the cylinders by means of cellophane tape. The loaded cylinders were then placed in a brass mold containing three holes, each 4 in. deep 2 in. in diameter. A bellows was then attached to the top of the mold so as to supply 24 p.s.i. air pressure to the ammonium nitrate particles in the cylinders. The entire arrangement was then placed in an oven which was fitted with both heating and cooling means. The samples were then heated from 50 to 140° F. and maintained 13 hrs., after which the samples were cooled to 50° F. over a 3 hr. period. The full cycle of from 50 to 140° F. and back to 50° F. required 6 hrs., and this cycle was carried out three times, requiring a total time of 18 hrs. for three full cycles. The samples were then removed from the oven and let stand until they reached room temperature. The ammonium nitrate cakes which had formed were then removed from the cylinders, and the cakes were tested to breaking or crushing in a Carver commercial press. The total pounds required to break each cake was recorded, and since the corresponding sectional area of each cake was 2.75 sq. in., the breaking pressure in p.s.i. was calculated and recorded. Where this procedure resulted in ammonium nitrate samples which did not cake but rather were free-flowing, these samples were designated "FF." And where the procedure resulted in ammonium nitrate cakes which collapsed upon subjection to initial pressure (i.e., less than 10 p.s.i.) in the Carver press before a pressure reading could be noted, such examples were designated as "LB" to denote light bridging and collapse of the cakes to free-flowing prills.

To evaluate swelling, the samples of the ammonium nitrate were placed in small glass vials after which the vials were tightly sealed by capping. The vials were then subjected to temperature cycling between 38 and 115° F.; each time the temperature was elevated to 115° F. it was counted as one temperature change. Thus, the full cycle of from 38 to 115° F. and back to 38° F. is considered as two temperature changes. The volume increase of the ammonium nitrate in each vial was measured by measuring the level of the ammonium nitrate in the vial with a meter stick. Since the diameter of the vial was constant, an increase in height of the ammonium nitrate in the vial is directly proportional to volume increase.

Data for the swelling and caking test and the results obtained by these results are set forth in Table III.

TABLE III

| Run | Water content of nitrate wt. percent | Coating agent | Amount of coating agent on nitrate, wt. percent | Crushing strength of coated nitrate, p.s.i. | Swelling of coated nitrate Percent swell | Swelling of coated nitrate Number of temp. changes |
|---|---|---|---|---|---|---|
| 1 | 0.15 | None | 0 | 200 | 62 | 21 |
| 2 | 0.15 | Attapulgite | 1 | 280 | 10 | 21 |
| 3 | 0.16 | ....do.... | 2 | 160 | 9 | 20 |
| 4 | 0.23 | ....do.... | 3 | 130 | 9 | 21 |
| 5 | 0.15 | Kaolin | 1 | 500 | 37 | 20 |
| 6 | 0.16 | ....do.... | 2 | 310 | 30 | 16 |
| 7 | 0.17 | ....do.... | 3 | 220 | 26 | 16 |
| 8 | 0.25 | Diatomaceous earth | 1 | 200 | 20 | 19 |
| 9 | 0.20 | ....do.... | 2 | 200 | 21 | 19 |
| 10 | 0.25 | ....do.... | 3 | 50–180 | 20 | 23 |
| 11 | 0.14 | Attapulgite plus 3 wt. percent sulfonate A | 1 | 100 | 8 | 21 |
| 12 | 0.16 | ....do.... | 2 | ¹ FF | 6 | 21 |
| 13 | 0.14 | ....do.... | 3 | FF | 5 | 21 |
| 14 | 0.13 | Attapulgite plus 1.5 wt. percent sulfonate B | 1 | 60 | 3–10 | 21 |
| 15 | 0.15 | ....do.... | 2 | 30 | 3–10 | 21 |
| 16 | 0.16 | ....do.... | 3 | FF | 3–10 | 21 |
| 17 | 0.17 | Attapulgite plus 3 wt. percent sulfonate B | 1 | ² LB | 3–12 | 21 |
| 18 | 0.18 | ....do.... | 2 | FF | 3–10 | 21 |
| 19 | 0.13 | Kaolin plus 3 wt. percent sulfonate A | 1 | LB | 23 | 20 |
| 20 | 0.16 | Kaolin plus 3 wt. percent sulfonate B | 1 | LB | 12 | 21 |
| 21 | 0.18 | ....do.... | 2 | FF | 12 | 20 |
| 22 | 0.13 | Diatomaceous earth plus 3 wt. percent sulfonate A | 1 | 300 | 16 | 21 |
| 23 | 0.13 | ....do.... | 2 | 220 | 14 | 21 |
| 24 | 0.15 | ....do.... | 3 | LB | 8 | 21 |
| 25 | | Diatomaceous earth plus 3 wt. percent sulfonate B | 1 | | 23 | 21 |
| 26 | | ....do.... | 2 | | 19 | 21 |
| 27 | | ....do.... | 3 | | 14 | 21 |

¹ FF = Free-flowing prills.   ² LB = Light bridging of cake, readily collapsed to free-flowing prills.

*Example II*

In this example, a number of runs were carried out in which attapulgite was admixed with calcium petroleum sulfonate to prepare a novel coating agent of this invention. The calcium petroleum sulfonate was prepared in the same manner as that set forth in Example I, and it was worked up and admixed with the attapulgite like that of "sulfonate A" of Example I. This coating agent was then used in coating ammonium nitrate prills, and its ability to increase the storage stability of such prills was then evaluated according to those procedures described in Example I. For purposes of comparison, uncoated ammonuim nitrate prills and ammonium nitrate prills coated with attapulgite per se were also avaluated. Results of these evaluations are summarized in Table IV.

TABLE IV

| Run | H₂O content of coated nitrate, wt. percent | Coating agent | Amt. of coating agent on nitrate, wt. percent | Crushing strength of nitrate, p.s.i. | Swelling ¹ of nitrate, percent |
|---|---|---|---|---|---|
| 1 | 0.15 | None | 0 | 200 | 62 |
| 2 | 0.14 | Attapulgite | 1 | 150 | 12.5 |
| 3 | 0.16 | ....do.... | 2 | 90 | 10.1 |
| 4 | 0.20 | ....do.... | 3 | 40 | 4.5 |
| 5 | 0.13 | Attapulgite plus 1 wt. percent sulfonate A | 1 | ² 2LB | 10.2 |
| 6 | 0.14 | ....do.... | 2 | LB | 7.5 |
| 7 | 0.16 | Attapulgite plus 2 wt. percent sulfonate A | 1 | LB | 9.5 |
| 8 | 0.21 | ....do.... | 2 | LB | 8.7 |
| 9 | 0.10 | Attapulgite plus 3 wt. percent sulfonate A | 0.75 | LB | 13.0 |
| 10 | 0.11 | ....do.... | 1 | LB | 10.0 |
| 11 | 0.19 | ....do.... | 2 | ³ FF | 4.2 |
| 12 | 0.22 | ....do.... | 3 | FF | 4.2 |
| 13 | 0.17 | Attapulgite plus 5 wt. percent sulfonate A | 1 | LB | 12.0 |
| 14 | 0.18 | ....do.... | 2 | FF | 7.5 |
| 15 | 0.18 | Attapulgite plus 10 wt. percent sulfonate A | 1 | LB | 10.0 |
| 16 | 0.19 | ....do.... | 2 | FF | 10.0 |

¹ Run No. 1 was evaluated after 21 temperature changes, all other runs after 20 temperature changes.
² LB = Light bridging of cake, readily collapsed to free-flowing prills.
³ FF = Free-flowing prills.

The data of Tables III and IV show that the novel two-component coating agents of this invention (Runs 11–27 of Table III and Runs 5–16 of Table IV) are surprisingly effective in materially improving the storage stability of ammonium nitrate when compared with those runs in which the ammonium nitrate is coated only with one of the inorganic materials, viz., attapulgite, kaolin or diatomaceous earth. In addition, the data show that where attapulgite is employed as the inorganic component in the coating agent of this invention, the normal tendency of ammonium nitrate to swell is materially reduced, for example as low as 3%.

Various modifications and alterations of this invention will become apparent to those skilled in the art without departing from the scope and spirit of this invention, and it should be understood that this invention is not to be limited unduly to that set forth herein for illustrative purposes.

I claim:
1. A method for improving the storage stability of particulate ammonium nitrate, which comprises coating said ammonium nitrate with a material which comprises, as the sole essential storage stability agent, an admixture of a minor amount of a water insoluble alkaline earth metal petroleum sulfonate of a deasphalted and solvent refined lubricating oil bright stock having a viscosity of at least 90 SUS at 210° F. and a major amount of an inorganic material selected from the group consisting of attapulgite, kaolin, and diatomaceous earth, said agent being employed in an amount sufficient to improve the storage stability of said ammonium nitrate.

2. The method according to claim 1, wherein the amount of said agent on the ammonium nitrate is 0.5 to 5 weight percent, and said water insoluble alkaline earth metal petroleum sulfonate amounts to 0.25 to 12 weight percent of said agent.

3. The method according to claim 1 wherein said alkaline earth metal petroleum sulfonate is calcium petroleum sulfonate of a highly paraffinic, propane-fractionated.

solvent extracted and dewaxed Mid-Continent oil of about 180 to 230 SUS at 210° F. and a viscosity index of at least 85 to 100.

4. The method according to claim 3 wherein said inorganic material is attapulgite.

5. The method according to claim 3 wherein said inorganic material is kaolin.

6. The method according to claim 3 wherein said inorganic material is diatomaceous earth.

7. As a new composition of matter, particulate ammonium nitrate coated with a coating agent comprising in admixture a minor amount of a water insoluble alkaline earth metal petroleum sulfonate and a major amount of an inorganic material selected from the group consisting of attapulgite, kaolin, and diatomaceous earth, said agent being employed in an amount sufficient to improve the storage stability of said ammonium nitrate.

8. A new composition of matter according to claim 7 wherein said amount of said coating agent on said ammonium nitrate is 0.5 to 5 weight percent, and said sulfonate amounts to 0.25 to 12 weight percent of said water insoluble coating agent.

9. A new composition of matter according to claim 7 wherein said alkaline earth metal petroleum sulfonate is calcium petroleum sulfonate of a highly paraffinic, propane-fractionated, solvent extracted and dewaxed Mid-Continent oil of about 180 to 230 SUS at 210° F. and a viscosity index of at least 85 to 100.

10. A new composition of matter according to claim 9 wherein said inorganic material is attapulgite.

11. A new composition of matter according to claim 9 wherein said inorganic material is kaolin.

12. A new composition of matter according to claim 9 wherein said inorganic material is diatomaceous earth.

13. A new composition of matter comprising in admixture a minor amount of a water insoluble alkaline earth metal petroleum sulfonate and a major amount of an inorganic material selected from the group consisting of attapulgite, kaolin and diatomaceous earth.

14. An explosive composition comprising a major amount of ammonium nitrate coated with a coating agent and a minor amount of a combustible carbonaceous material, said coating agent comprising in admixture a minor amount of a water insoluble alkaline earth metal petroleum sulfonate and a major amount of an inorganic material selected from the group consisting of attapulgite, kaolin and diatomaceous earth.

References Cited by the Examiner
UNITED STATES PATENTS

| | | | |
|---|---|---|---|
| 2,644,769 | 7/1953 | Robinson | 23—103 X |
| 2,720,446 | 10/1955 | Whetstone et al. | 23—103 |
| 2,782,096 | 2/1957 | Ames | 23—103 |
| 2,794,701 | 6/1957 | Ames et al. | 23—103 |
| 3,034,858 | 5/1962 | Vives | 23—103 |
| 3,041,159 | 6/1962 | Smith | 23—103 X |

MAURICE A. BRINDISI, *Primary Examiner.*